US006881907B2

United States Patent
Winkelmolen

(10) Patent No.: US 6,881,907 B2
(45) Date of Patent: Apr. 19, 2005

(54) METHOD AND APPARATUS FOR PRODUCT ATTRIBUTE MEASUREMENT

(75) Inventor: Antoine J. H. Winkelmolen, Shawnee, KS (US)

(73) Assignee: Johnson Food Equipment, Inc., Kansas City, KS (US)

(*) Notice: Subject to any disclaimer, the term of this patent is extended or adjusted under 35 U.S.C. 154(b) by 31 days.

(21) Appl. No.: 10/262,223

(22) Filed: Oct. 1, 2002

(65) Prior Publication Data

US 2004/0060744 A1 Apr. 1, 2004

(51) Int. Cl.[7] ................................................. G01G 9/00
(52) U.S. Cl. ..................... 177/145; 177/208; 177/254; 209/591; 209/582
(58) Field of Search ............................... 177/145, 208, 177/254; 209/592, 591, 576–582

(56) References Cited

U.S. PATENT DOCUMENTS

| | | | | |
|---|---|---|---|---|
| 3,642,130 A | * | 2/1972 | Altenpohl | 209/592 |
| 3,805,904 A | * | 4/1974 | Zimmerer | 177/54 |
| 4,096,950 A | * | 6/1978 | Brook | 209/593 |
| 4,148,397 A | * | 4/1979 | Altenpohl et al. | 209/559 |
| 4,187,945 A | * | 2/1980 | Altenpohl et al. | 209/592 |
| 4,223,751 A | * | 9/1980 | Ayers et al. | 177/210 C |
| 4,238,027 A | * | 12/1980 | Oelte | 177/50 |
| 4,306,629 A | * | 12/1981 | Powell | 177/1 |
| 4,586,613 A | * | 5/1986 | Horii | 209/556 |
| 4,881,863 A | * | 11/1989 | Braginsky | 414/225.01 |
| 4,940,536 A | * | 7/1990 | Cowlin et al. | 209/592 |
| 5,020,675 A | * | 6/1991 | Cowlin et al. | 209/538 |
| 5,037,351 A | * | 8/1991 | Van Den Nieuwelaar et al. | 452/179 |
| 5,078,258 A | * | 1/1992 | van der Schoot | 198/384 |
| 5,306,877 A | * | 4/1994 | Tas | 177/145 |
| 5,458,455 A | * | 10/1995 | Oyama et al. | 414/791.1 |
| 5,504,278 A | * | 4/1996 | Deters et al. | 177/145 |
| 5,725,082 A | | 3/1998 | Connell | 198/471.1 |
| 5,750,938 A | * | 5/1998 | De Caris et al. | 177/50 |
| 6,073,667 A | * | 6/2000 | Graffin | 141/372 |
| 6,179,129 B1 | * | 1/2001 | Powell, Jr. | 177/145 |
| 6,387,330 B1 | * | 5/2002 | Bova et al. | 422/100 |
| 6,452,118 B1 | * | 9/2002 | van Pinxteren et al. | 177/145 |
| 6,630,633 B1 | * | 10/2003 | Uber et al. | 177/145 |
| 6,674,022 B1 | * | 1/2004 | Fermier et al. | 177/60 |

* cited by examiner

Primary Examiner—Randy W. Gibson
(74) Attorney, Agent, or Firm—Spencer Fane Britt & Browne LLP

(57) ABSTRACT

A method and apparatus is provided for determining an attribute of an article during the transfer of the article by an article-feeding machine during the transfer of the article from one location to another location.

31 Claims, 5 Drawing Sheets

METHOD AND APPARATUS FOR PRODUCT ATTRIBUTE MEASUREMENT

FIELD OF THE INVENTION

This invention relates to a method and apparatus for measuring an attribute of an item as it is being transferred from one point to another. More particularly, the method and apparatus relate to the use of a measuring device such as a device for measuring weight, color, shape, etc., of an object into an article-transfer or article-feeding apparatus that is used in a conveyor line.

BACKGROUND OF THE INVENTION

In food processing facilities, it is typically necessary to select a single article or food item from a bulk load of such food items and to grade, or weigh or measure some attribute of the food item so that it can be placed into a group along with other food items having the similar attribute. This is done for purposes of pricing the food item or for meeting particular specifications related to the food item. To accomplish this task of measuring an attribute of a food item, it has typically been necessary to select the food item from a bulk group of similar type items and to move the isolated item from a first location to a conveyor which will move the food item past a device for measuring the attribute of interest. For example, in food processing, a prior art article-feeding device is available which is used to transfer bodies of semi-rigid or non-rigid structure and having a slippery surface and irregular shape, such as chicken parts, from one conveyor to a second conveyor. On the second conveyor the weight of the body or chicken part is measured. A device for performing this transfer operation from a first location onto a conveyor can be found and examined in U.S. Pat. No. 5,725,082 to Connell (1998) the specification of which is incorporated herein by reference. It should be appreciated that the device described in the Connell patent simply transfers the object or food item from a bulk retention area to a conveyor which then carries the item to another location or to a point at which the weight of the item may be measured. A device similar to the Connell device is shown in FIG. 2 at reference number 28. Other prior art article-feeding machines such as those found in U.S. Pat. No. 3,941,233 to Aluola, et al. (1976) and U.S. Pat. No. 5,381,884 to Spatafora, et al., (1995) transfer objects that arrive at the article-feeding machine in spaced fashion on a first conveyor prior to transfer. Then, via suction, these machines pick up the article and transfer the article to a second conveyor. In none of these article-feeding machines does the machine, during the transfer process, perform any measurement or analysis of any attribute of the article being transferred.

As a result of this single-purpose activity of such prior art article-feeding machines, it is necessary to use additional pieces of equipment within a process line which; receive the item from the article-feeding machine; transfer the item to a point at which analysis of the attribute is made; and an apparatus to carry the article away from the analysis point. This additional equipment adds to the processing cost and adds to the space used by a food article process line. The additional equipment increases the maintenance costs of a food article process line as the additional equipment requires maintenance and cleaning.

Therefore, it would be a benefit to provide within such article-feeding or article-transfer machines a means for measuring an attribute of the article being transferred to allow increased efficiency of a food process line.

Another benefit of inclusion of an attribute measuring device within an article-feeding machine is that the size and space requirement of a food processing line could be reduced.

Yet another benefit of including an attribute measuring device within an article-feeding machine is that additional equipment needed to transfer and to measure the attribute in the prior art food processing line can be eliminated thus reducing the cost of the food processing line and the maintenance cost of the food processing line.

Other advantages and benefits of the present invention will become apparent upon examination of the detailed description of the preferred embodiment as well as the drawings included herewith.

SUMMARY OF THE INVENTION

The invention relates to a method and apparatus for measuring an attribute of a food article or other item being moved from a first location to another location by an article-feeding machine.

In one embodiment of the present invention, a load cell or scale is incorporated into the article-feeding or article-transfer machine to measure the weight or mass of the article being transferred.

In another embodiment of the present invention, a camera is included in the article feeding machine to capture an image of the shape of the article being transferred for comparison with reference files in a computer to confirm the acceptability or to determine grading of the article being transferred based on its shape or color or texture.

In yet another embodiment of the present invention, the article-feeding machine is equipped with an apparatus for measuring the reflectance of the article being transferred or with a colorimeter to enable the measurement of color or surface quality attributes of the article being transferred.

In yet another embodiment of the present invention, a pressure sensor is included to contact the article to determine the resistance of the article being transferred.

In yet another embodiment of the present invention, a temperature sensor is included to determine the temperature of the article being transferred.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Figure 1:
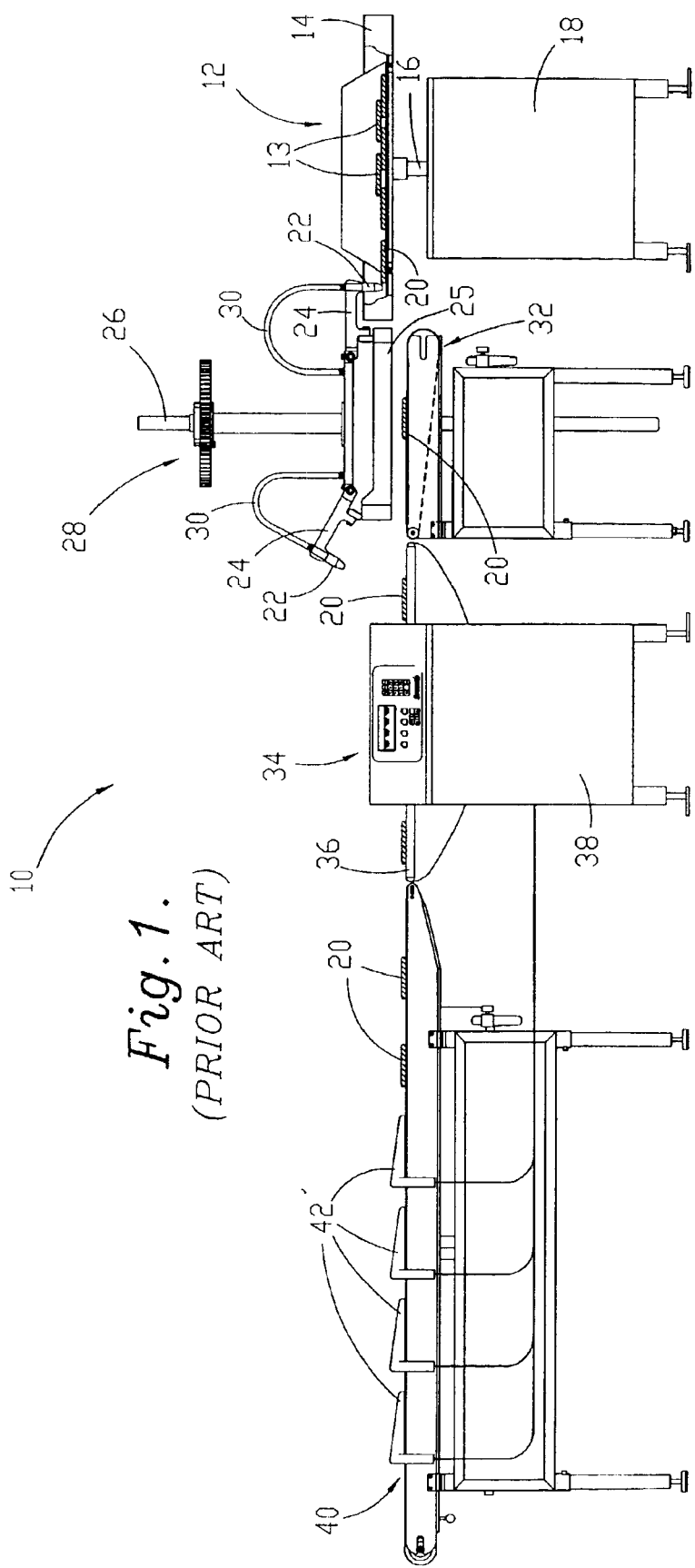
FIG. 1 is an elevation view of a prior art weighing and separation process line.

Referring to FIG. 1, a typical prior art product determination and separation process line is shown. The determination and separation process line shown in FIG. 1 is designed for determination of the weight of an individual product item. In general, weighing and separation process line 10 of FIG. 1 is composed of several different stations through which a product is moved in a manner which accomplishes: (1) acquisition of an individual product item from a group or batch of such products; (2) the delivery of the individual product to a conveyor line in a spaced fashion; (3) the weighing of each individual product; (4) delivery of the individual product to a distribution area; and (5) grouping of the individual product into a bin or holding area with other products having a similar weight.

Still referring to FIG. 1, the prior art weighing and separation process line 10 shown in FIG. 1 now will be more particularly described. In the typical prior art weighing and separation process line 10 shown in FIG. 1, bulk delivery of product 13 is presented to product delivery station 12. Product delivery station 12 is typically provided with turntable 14 operated by drive 16 supported on base 18. Instead of a turntable, product delivery station 12 could be a conveyor or a bin or hopper which provides the bulk items for pick up. Turntable 14 continually moves bulk product 13 to a location on product delivery station 12 where it is accessible by a pickup device which will remove an individual item of bulk product 13 for eventual disposition onto a conveyor where a number of activities may be performed on the product. In the weighing and separation process line 10 shown in FIG. 1, the individual product 20 becomes adhered to vacuum pickup head 22 which is attached to a pickup arm 24. Pickup arm 24 rotates about central shaft 26 of product transfer station 28 and traces a path delineated by cam 25. A low pressure atmosphere is delivered to vacuum pickup head 22 by vacuum line 30. A description of such an article-transfer device having a vacuum pickup and carousel device can be found in U.S. Pat. No. 5,725,082 and which description is incorporated herein by reference. By use of the vacuum pickup, products having generally a smooth surface and which are soft and/or variously shaped may be picked up by vacuum head 22 and separated from the bulk product group 13 on turntable 14. While a vacuum pickup is provided in a preferred embodiment, it will be appreciated that a mechanical holding means such a hook or spear point mounted on pickup arm 24 could be used to secure the bulk item to pickup arm 24.

Figure 2:
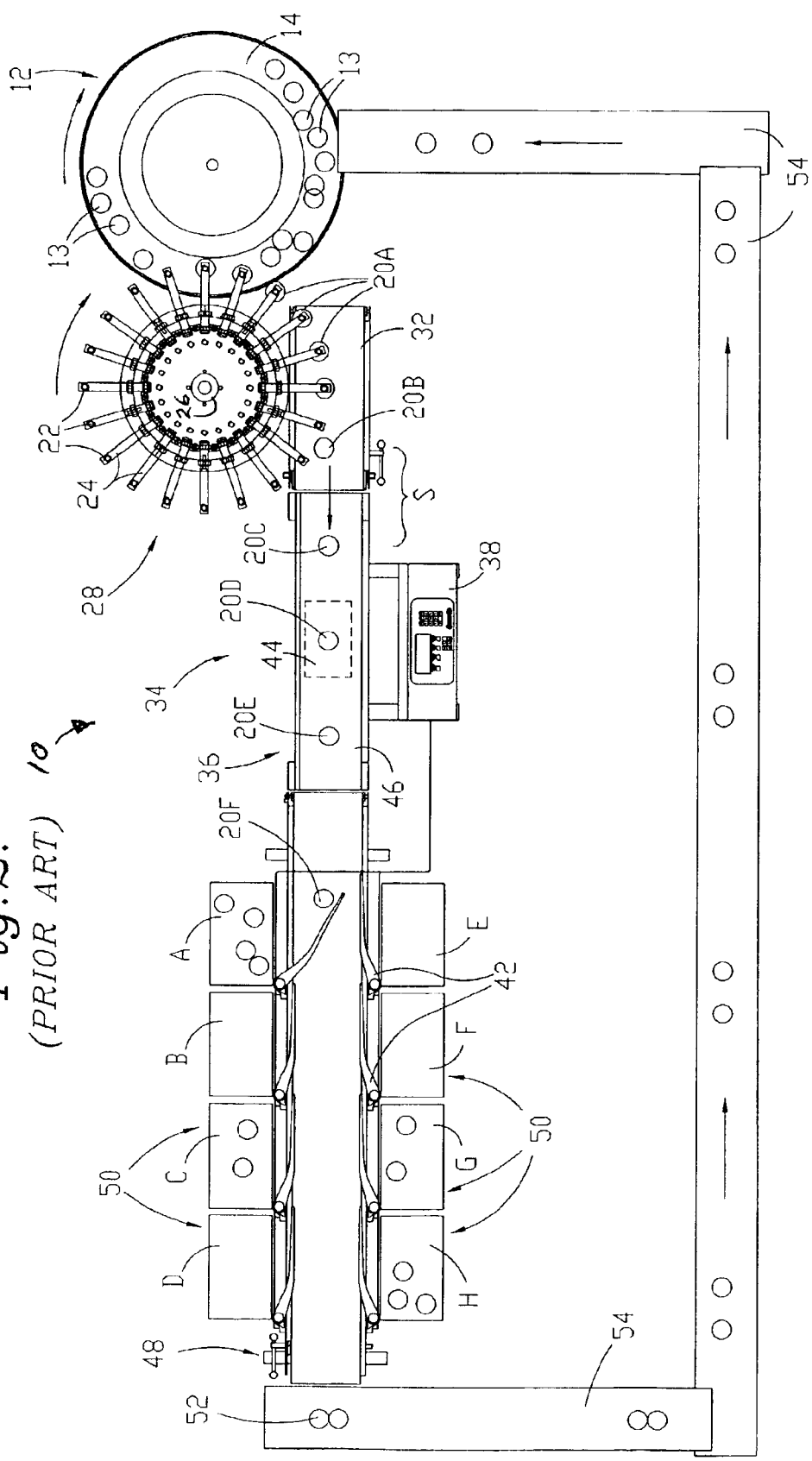
FIG. 2 is a plan view of a prior art weighing and separation process line.

Central shaft 26 of product transfer station 28 rotates at a rate such that once vacuum pickup head 22 has extracted an individual product 20 from turntable 14, pickup arm 24 is rotated at a sufficient rate as to deposit product 20 onto takeaway conveyor 32 with a desired spacing between each product 20 so deposited. The proper rotational rate of central shaft 26 of product transfer station 28 is necessary so that as each individual product 20 is deposited onto takeaway conveyor 32, sufficient spacing exists between each individual product 20 so that only a single product 20 is positioned on weighing station 34 at a time. An individual product 20 deposited on takeaway conveyor 32 is delivered to weighing conveyor 36 which moves the individual product 20 across weighing station 34 which is equipped with a load cell 44 (FIG. 2) or other such scale whereupon the individual product 20 is weighed and the weight registered in computer 38 of weighing station 34. After the individual product 20 has been weighed on weighing station 34, and the weight registered in computer 38, individual product 20 is delivered to distribution conveyor 40. Distribution conveyor 40 operates to separate the individual products 20 into a number of categories depending upon the weight of individual product. In the particular line 10 shown in FIG. 1, distribution conveyor 40 has been designed to receive from computer 38 the weight of the individual product 20 determined at weighing station 34 and to deflect individual product 20 into the appropriate holding bin A-H (FIG. 2). The deflection of individual product 20 by deflection arm 42 is activated by computer 38 in response to the selection by computer 38 of the particular deflection arm 42 which is associated with bin A-H that contains the weight category of individual product 20. The weight of product 20 was previously determined at load cell 44 (FIG. 2) and communicated to computer 38. In the manner just described, bulk delivery of product to product delivery station 12 results in each individual product item of the bulk delivery being individually retrieved from the turntable 14; placed onto a conveyor in such a spaced fashion to allow time for performance of a weight determination test on the individual product 20; and placement of the individual product 20 into a container having a group of individual products 20 therein all having a similar weight.

Referring now to FIG. 2, prior art weighing and separation process line 10 will be additionally described with reference to the plan view of the process line of in FIG. 2. In FIG. 2, as previously described in FIG. 1, bulk product 13 is delivered to product delivery station 12 where it rotates on turntable 14 until vacuum pickup head 22 mounted on pickup arm 24 of product transfer station 28 separates or captures an individual product 20a from the bulk product 13 rotating on turntable 14. As central shaft 26 of product transfer station 28 rotates, the captured individual products 20a are delivered to takeaway conveyor 32 and deposited on conveyor 32 to provide released individual product 20b. The rotational rate of central shaft 26 is such that spacing is provided between each released individual product 20b thus creating the spacing shown by bracket S in FIG. 2. Spacing S designates the spacing between released individual product 20b and weight station approaching product 20c.

After captured individual product 20a has been released by pickup arm 24 onto takeaway conveyor 32, it is moved by conveyor 32 toward weighing conveyor 36 where individual product 20d is moved across load cell 44 which is positioned underneath belt 46 of weighing conveyor 36. As shown in FIG. 2, the rotational rate of central shaft 26 of product transfer station 28 creates a spacing S such that when a weighed product 20d is positioned directly on load cell 44, approaching individual product 20c is on weighing conveyor 36 but is not on load cell 44 and departing product 20e has been moved off of load cell 44 after being weighed. In this manner, only a single product is positioned on load cell 44 at any one time so that the appropriate weight of a single item can be measured. After an individual product has been weighed on load cell 44, such as is the case with weighed product 20d of FIG. 2, the product is moved off of load cell 44 by weighing conveyor 36 into position 20e of a departing product. The departing product 20e is moved to the end of weighing conveyor 36 and transferred onto distribution conveyor 48.

Once the individual product 20f is placed on distribution conveyor 48, it is deflected into the appropriate distribution bin 50A-H by one of deflection arms 42. Deflection arms 42 are activated by a signal from computer 38. Computer 38 activates a particular deflection arm 42 in response to the particular attribute of individual product 20 which has been measured or detected. In the case of the separation process line 10 shown in FIG. 2, the weight of the individual product 20. Therefore, as individual product 20f moves onto distribution conveyor 48, one of deflection arms 42 is caused to open by computer 38. In the particular case shown in FIG. 2, deflection arm 42 associated with bin A is opened by a signal from computer 38 and product 20f is scooped off of distribution conveyor 48 and into bin A by deflection arm 42 associated with bin A.

In such a separation process line, there will be instances in which the weight of the product being moved cannot be determined for one reason or another. Such products for which the weight cannot be determined are allowed to proceed down the length of distribution conveyor 48 without being deflected into one of bins A-H. At the end of distribution conveyor 48, the non-standard product 52 is deposited onto recirculation conveyor 54. Such a non-standard product may be transferred back to product delivery station 12 or it may be rejected entirely, or it may be acted upon a worker so that the non-standard product 52 is adjusted to conform to the standard configuration of products 13. It will be appreciated that in the case of line 10 such non-standard products could be a product which is overweight or underweight, or an instance in which pickup arm 42 has picked up two products from turntable 14 rather than one. Such a double product pickup would deposit two products simultaneously onto takeaway conveyor 32 thus producing an overweight situation at weighing station 34. Alternatively, non-standard products 52 could be products that are to be rejected such as those that are off color or deformed in some particular fashion or otherwise not acceptable products for separation into bins 50A-H at distribution conveyor 48.

Examination of process line 10 shown in FIG. 2 will show the substantial amount of space that is consumed by the need to use three different conveyors—the takeaway conveyor 32, the weighing conveyor 36 and distribution conveyor 48—during the separation process, as well as the substantial space consumed by recirculation conveyor 54 which must remove product from the end of distribution conveyor 48 and transmit it back to the opposite end of the process line 10 to product delivery station 12. As each square foot of floor space consumed in a process increases the cost to produce the product, the advantages of a process line which reduce the number of conveyors involved and which reduces the overall size of the process line would be of great advantage to produce a product which must be graded, analyzed and separated into various categories. The present invention, which will be described in detail hereinafter, provides such a reduced space consumption of a process line.

Figure 3:
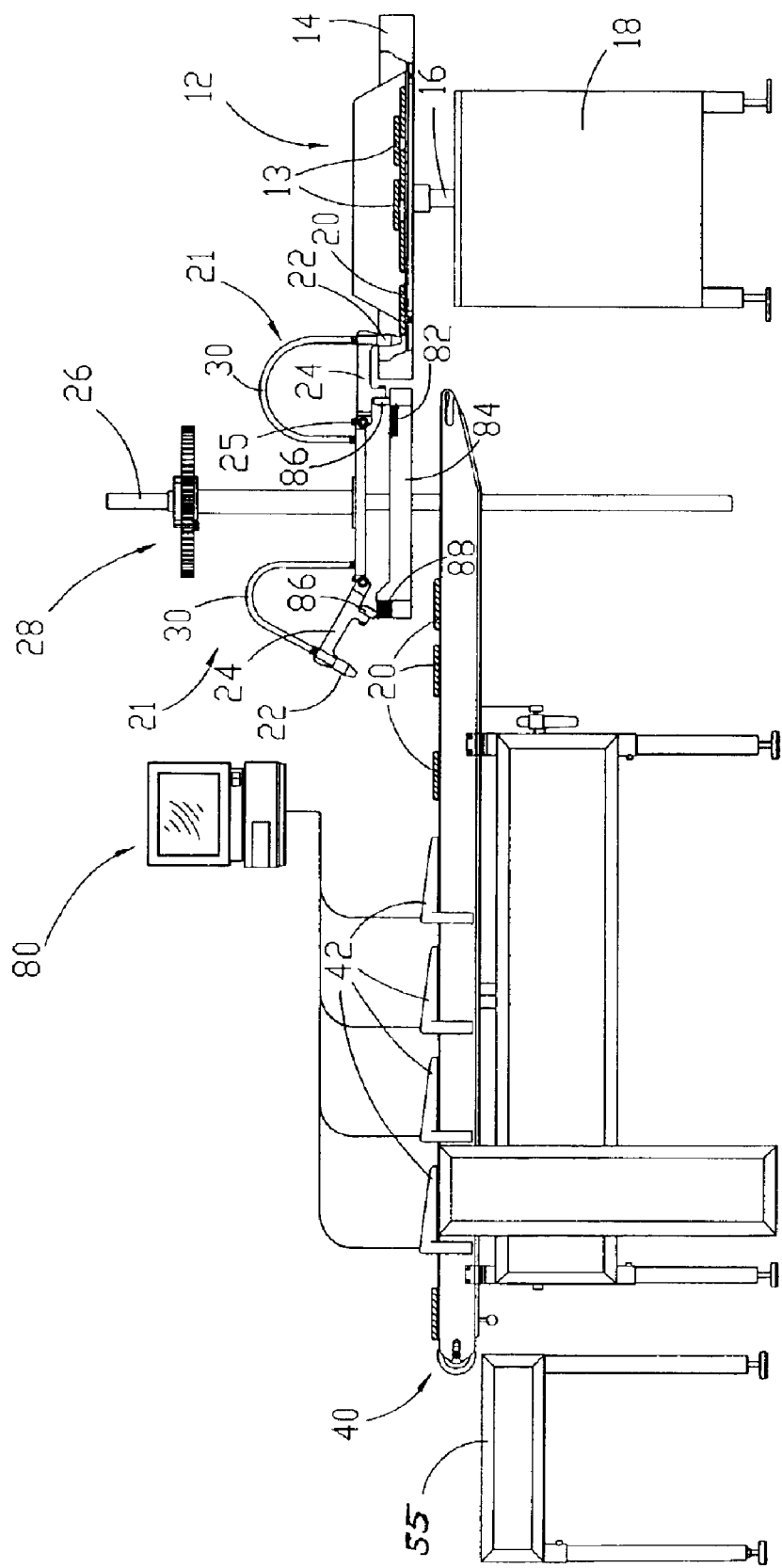
FIG. 3 is an elevation view of the weighing and separation process line of the present invention.

Referring now to FIG. 3, an attribute analysis and separation process line 80 of the present invention is shown in elevation view. The attribute selected for measurement in such an attribute determination and separation process line can be product weight or product coloration or product surface texture or product shape or product temperature or a variety of other attributes. As can be observed by comparing FIG. 3 and FIG. 4 with FIG. 1 and FIG. 2, process line 80 of the present invention substantially reduces the overall size of the process line by elimination of takeaway conveyor 32 and weighing conveyor 36 and most of recirculation conveyor 54. This allows distribution conveyor 40 to be placed proximate to product transfer station 28 to immediately receive individual product 20 when it is released from vacuum head 22 of pickup arm 24. This space saving advantage provided by process line 80 is achieved by the incorporation of the devices for determining a product attribute such as weight or color or shape or temperature or other product attribute either on, or proximate to, product transfer station 28. This allows the product attribute to be measured or determined during the interval of time which the individual product 20 is being transferred from product delivery station 12 to distribution conveyor 40 on vacuum head 22. It will be appreciated that the determination of the attribute can be made either while vacuum head 20 is holding the individual product item 20 or during the time that product item 20 is released from vacuum head 22 to fall onto distribution conveyor 40. An example of the first instance would be the measurement of the weight of the individual product 20 while it is held on vacuum head 22. Such an embodiment will be described in greater detail hereinafter. An example of the second type of determination of an attribute is the determination of product color which could be determined by a light reflectance-type measurement taken from the surface of individual product 20 as it falls from vacuum head 22 toward distribution conveyor 40. Once the individual product 20 is delivered to distribution conveyor 40, a computer 80 which has registered the data accumulated during the measurement of the product attribute, then activates one of several deflection arms 42 to separate individual product 20 into its proper category. In one alternative embodiment, if the computer does not activate any of deflection arms 42, the individual product 20 can be allowed to continue past the collection bins and onto the end of distribution conveyor 40 where the individual product can be placed in rework bin or refuse bin 55 if the product is outside of specifications.

In yet another alternative embodiment which provides a space and time saving benefit, the product 20 can be recycled back to product delivery station 12 by the depositing of a product 20, which is outside of specifications, onto recirculation conveyor 54 (FIG. 4) for a second pass through processing line 80. Recirculation conveyor 54 can be used in cases in which the attribute of interest is incorrectly measured, or more than one product 20 is picked up or it is desired that a worker E' be stationed near recirculation conveyor 54 to rework or modify the product 20 which was determined to be outside of specifications.

Still referring to FIG. 3, the operation of process line 80 will be described for the instance in which product weight is the attribute of individual product being measured at product transfer station 28 during the transfer of the individual product 20 from product delivery station 12 to distribution conveyor 40. In an embodiment of the present invention, in which the attribute of individual product 20 to be measured is the weight of individual product 20, the weight of which is determined while individual product 20 is held by vacuum head 22 of pickup arm 24. The general operation of this embodiment is to first pickup an individual product 20 from the bulk product 13 in product delivery station 12 and then during the transfer of the individual product 20 to distribution conveyor 40 to make the determination of the individual product weight by use of a load cell 82 or scale or other weight measurement device. This weight measurement means can be integrated into the structure of product transfer station 28 to allow measurement of the weight of individual product 20 while it is held by vacuum head 22. In one embodiment of determining the weight of an individual product 20, a weight measurement means, such as a load cell 82, is incorporated into cam 84 of product transfer station 28. In this embodiment of process line 80 the weight of an individual product 20 is determined by first retrieving an individual product 20 from the bulk product 13 in product delivery station 12 by securing an individual product 20 onto vacuum head 22 of pickup arm 24. As central shaft 26 of product transfer station 28 continues to rotate, pickup arm 24 having vacuum head 22 and individual product 20 secured thereto is rotated along cam 84. Cam follower 86 attached to pickup arm 24 is moved across weight measurement means, or load cell 82, which is inserted into cam 84 to form a portion of the surface of cam 84 that cam follower 86 traverses. As central shaft 26 of product transfer station 28 continues to rotate, cam follower 86 attached to pickup arm 24 contacts load cell 82 and the total weight of the individual product 20 and cam follower 86 and pickup arm 24 and vacuum head 22 and vacuum line 30 are measured by load cell 82. To determine the actual weight of individual product 20, the tare weight of the cam follower 86, pickup arm 24, vacuum head 22, vacuum line 30 and any other parts which contribute to the weight measured on load cell 82 is determined by tare weight load cell 88. The tare weight is taken as cam follower 86 passes across load cell 88 after the release of product 20. Alternatively, the tare weight can be predetermined and programmed into the computer which receives the data from load cell 82. Alternatively, a tare weight load cell 88 can be included in cam 84 just prior to the capture of a new product 20 to determine the tare weight of the pickup unit equipment prior to the gathering of an individual product 20 from product delivery station 12. In either case, the tare weight is subtracted from the weight determined at load cell 82 to provide the actual weight of individual product 20 which is then used by the computer to open the appropriate deflection arm 42 on distribution conveyor 40 or to allow the individual product 20 to proceed past deflection arms 42 and to await further disposition.

Figure 4:
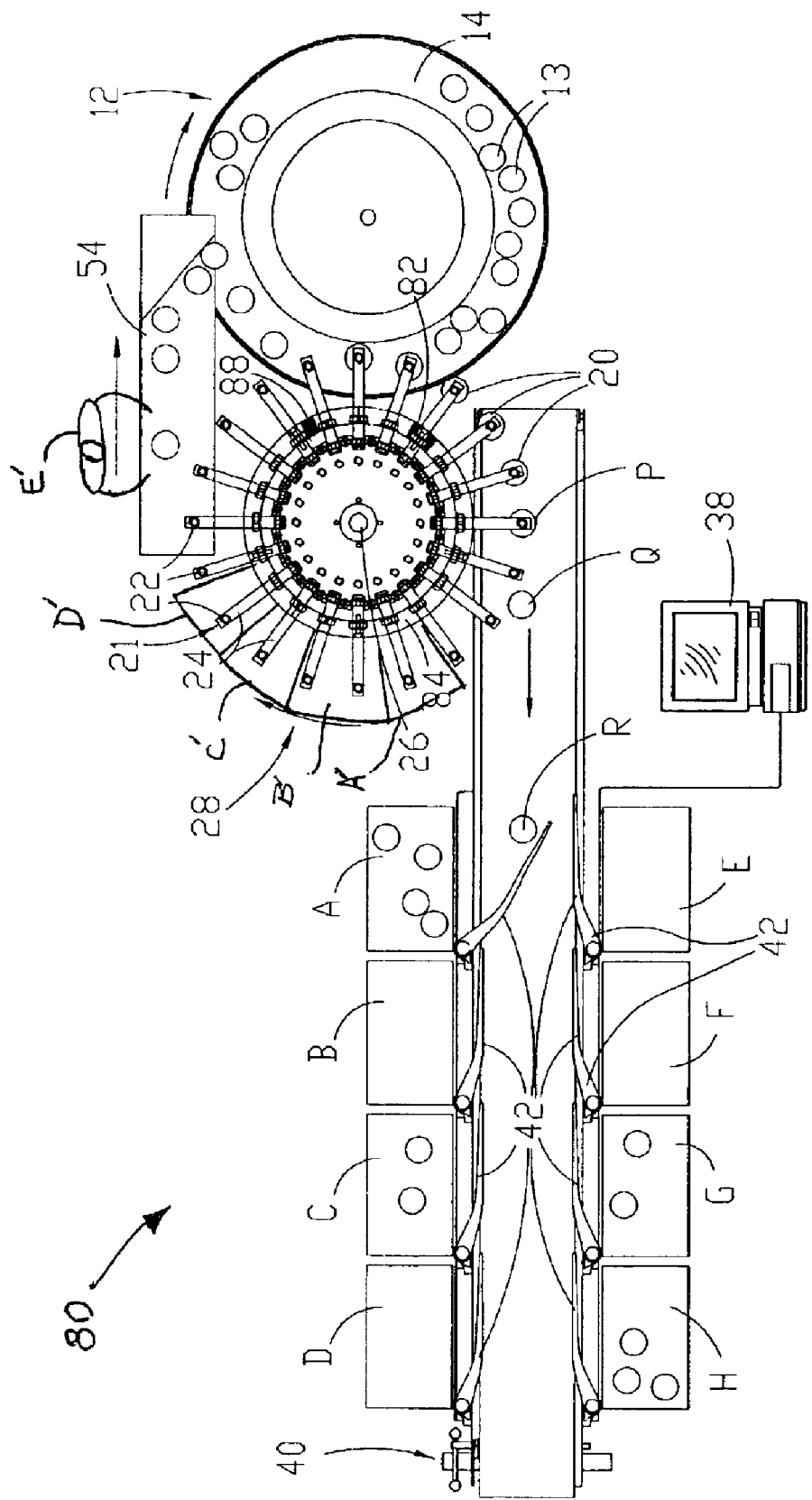
FIG. 4 is a plan view of the weighing and separation process line of the present invention.

Referring now to FIG. 4, the operation of an embodiment of process line 80 having weight determination equipment installed in product transfer station 28 is shown in plan view. In operation, a bulk supply of product 13 is placed on product delivery station 12 where it is brought into contact with vacuum heads 22 of pickup arm 24 by the rotation of turntable 14 in product delivery station 12. During the rotation of central shaft 26 of transfer station 28, a pickup unit 21 which is comprised of pickup arm 24 having vacuum head 22 attached thereto is rotated past tare weight sensing means 88, which in a preferred embodiment is a load cell, incorporated into cam 84 of product transfer station 28. After the tare weight pickup unit 21 is determined and transmitted to a computer associated with load cells 88 and 82. Pickup unit 21 is then rotated into contact with bulk product 13 on delivery station 12 and vacuum head 22 contacts and retains one of bulk products 13 on vacuum head 22 to provide individual product 20 which is secured to vacuum head 22. Central shaft 26 continues to rotate and thereby brings pickup unit 21 into position over weight measuring means or load cell 82 where cam follower 86 (FIG. 3) of pickup arm 24 causes the weight of pickup unit 21 containing individual product 20 to be registered on load cell 82. The determined weight is sent to the computer that is linked to load cell 82 and the actual weight of product 20 is calculated. Central shaft 26 continues to rotate until pickup unit 21 containing individual product 20 is brought to position P at which time the vacuum being applied through vacuum line 30 to vacuum head 22 is terminated thereby allowing individual product 20 to fall onto distribution conveyor 40. During the time that central shaft 26 has been rotating to move pickup unit 21 from load cell 82 to position P, the weight determined on load cell 82 is communicated to the associated computer which then calculates the weight of product 20. Then, according to a set of standards programmed into the computer, a determination is made as to which of bins A-H individual product 20 is to be placed. Individual product 20 begins moving along distribution conveyor 40 from position P and into position Q and ultimately into position R at which point the activation of deflection arm 42 by computer 38 sweeps individual product 20, now in position R, off of distribution conveyor 40 and into bin A.

In the event that the measured attribute of product 20 does not fall within suitable product attribute parameters, product 20 can be retained on vacuum head 22 and not released. In this event, in the embodiment of FIG. 4, product 20 is not released from vacuum head 22, but is retained on pickup unit 21 until vacuum head 22 is positioned over a discard bin (not shown) or over a recirculation conveyor 54 (FIG. 4) where upon product 20 is released. If released product 20 presented a measured attribute which prevented product 20 from being a usable product it would have been released into a discard bin. If, alternatively, product 20 presented a questionable attribute, such as being twice the anticipated weight, it could be the case that pickup unit 21 had actually retained two product item on vacuum head 22 and therefore the release onto recirculation conveyor 54 allows the two items to be individually retrieved on a second pass by pickup unit 21. This has the advantage of avoiding passing product 20 along the entire route of distribution conveyor 40 (FIG. 2) and recirculation conveyor 54 (FIG. 2) thereby reducing the space consumed by the entire apparatus.

It will be appreciated by those skilled in the art that the present invention provides a further opportunity to compact the process line of FIG. 4 by the elimination of distribution conveyor 40 and the replacement of distribution conveyor 40 with a series of bins A', B', C', D' which are distributed around the circumference of product transfer station 28. In this manner, the entirety of distribution convey 40 can be eliminated, and the space consumed by the process line of FIG. 24 can be reduced to approximately half the space previously required. In the event that distribution conveyor 40 is eliminated and bins A', B', C', D' are used to receive product 20 as it is moved by product transfer station 28, a knock-off mechanism (not shown) can be incorporated onto pickup arm 24 so that as pickup head 22 of pickup arm 24 is rotated past one of bins A', B', C', D', a knock-off mechanism is actuated to remove product 20 from pickup head 22 and deposit product 20 into appropriate bin A', B', C', D'. Such a knock-off mechanism could be a pneumatic cylinder knock-off or a high pressure air knock-off mechanism or a solenoid which is activated to cut off the vacuum to pickup head 22 and allow product 20 to fall away from pickup arm 24 and into the appropriate bin. It will be appreciated by those skilled in the art that the activation means for the knock-off mechanism will be interconnected with the measurement device being used to measure the attribute of interest and that the result of the attribute measurement (e.g., a particular weight or color or texture or hardness) will dictate which particular bin A', B', C', D' is the appropriate receptacle for the particular product 20 as it is moved about on product transfer station 28. As has previously been indicated, the association of the product attribute with the appropriate bin and the timing of the knock-off mechanism is determined by the programming of computer 38 much as computer 38 activates a particular deflection arm 42 in response to the measurement of a particular attribute of an individual product 20 as previously described.

As previously described, the embodiment of FIG. 4 provides a space and time saving benefit when the product 20 need to be recycled back to product delivery station 12. If a product 20 is outside of specifications or requires reworking it can be dropped onto recirculation conveyor 54 (FIG. 4) for a second pass through processing line 80. Recirculation conveyor 54 can be used to simply recycle product 20 or a worker E' can be stationed near recirculation conveyor 54 to rework or modify a product 20 which was determined to be outside of specifications.

Figure 5B:
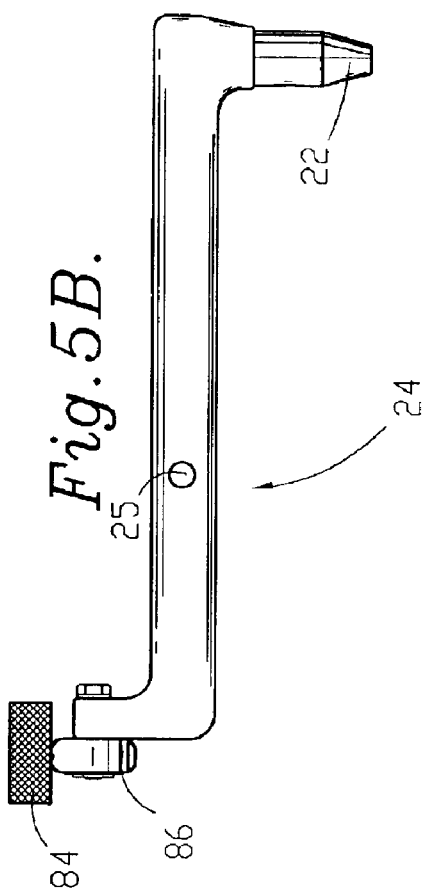
FIG. 5a–d shows alternate embodiments of the pickup arm having alternate placements of the pivot point, the cam follower and pickup head and which may be used in a separation process line embodying the present invention.
Figure 5D:
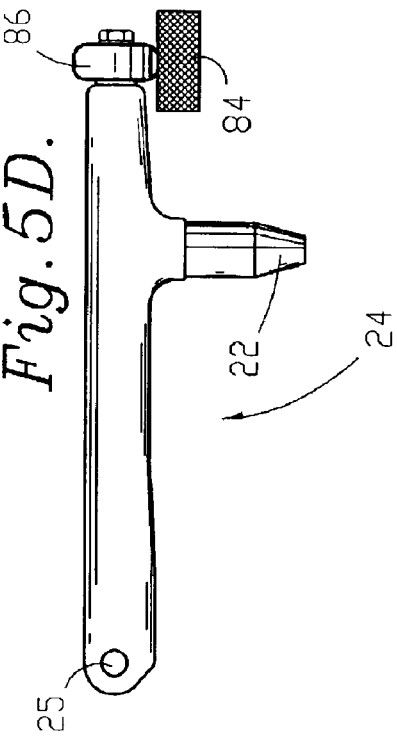
Figure 5A:
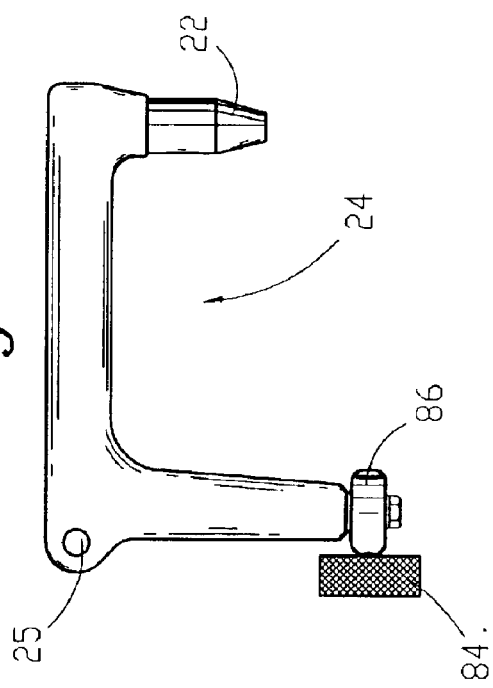
Figure 5C:
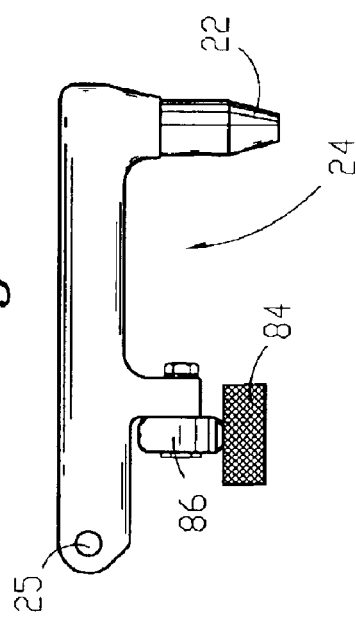

Referring now to FIGS. 5A–D several alternative embodiments of the pickup arm 24 of the present invention will be discussed to indicate some of the equivalent embodiments of the present invention. Referring now to FIGS. 5A–D, various embodiments of pickup arm 24 will be described to indicate alternate configurations of pickup arm 24 having vacuum head 22 thereon and cam follower 86 thereon and the relation of cam 84 to the various configurations of pickup arm 24. First referring to FIG. 5A, pickup arm 24 is configured, generally, into the shape of right angle with vacuum head 22 at the end of one leg of the right angle, and cam follower 86 at the end of the other leg of the right angle. Pivot 25 is located at the junction of the two legs of the right angle. In operation, as an individual product 20 is adhered to, vacuum nozzle 22 weight will be transmitted along arm 24 and pivot 25 to press cam follower 86 against cam 84. As arm 24 is moved along cam 84, cam follower 86 will contact the load cell which has been implaced into cam 84, and the weight of the product which is adhered to vacuum nozzle 22 will be registered on the load cell. Referring now FIG. 5B, an alternate embodiment of arm 24 is shown in which arm 24 has a central pivot point 25. At one end of arm 24 is vacuum nozzle 22 which receives the product thereon. When the product is attached to vacuum head 22, the weight of the product is transmitted through arm 24, and due to pivot 25, places an upward pressure against 84 by cam follower 86. Therefore, when cam follower 86 is aligned with the load cell which is placed into cam 84, the weight of the product attached to vacuum nozzle 22 will be detected, as well as the weight of the other components of arm 24. It will be appreciated that in each instance, the tare weight method previously described may be used to deduce the actual weight of the product attached to vacuum nozzle 22. Referring now to FIG. 5C, yet another configuration of arm 24 in which the pivot point 25 is at the end of arm 24 with vacuum nozzle 22 at the opposite end of arm 24. The weight of a product attached to nozzle 22 is transmitted through arm 24 and will detected by a load cell embedded within cam 84 when cam follower 86 contacts the load cell. Since the weight of the product on vacuum nozzle 22 is transmitted to cam follower 86 due to the positioning of pivot point 25 at the end of arm 24, the weight of the product can be detected using the tare weight method previously described. Referring now to FIG. 5D, yet another embodiment of arm 24 is shown. In this embodiment, cam follower 86 is at the opposite end of arm 24 from pivot point 25, and the weight transmitted to cam follower 86 from nozzle 22 when a product is placed thereon is detected by a load cell in cam 84.

In the previous description, a detailed description in various embodiments have been described for the measurement of weight or mass of a product which relies on the inclusion of a load cell within the article transfer unit of a food process line. As previously identified in the Summary of the Invention (above), alternate devices for measurement for attributes other than weights can also be included in the article transfer device 28 and such other devices for measuring other attributes are contemplated and included as alternate embodiments of the present invention. By way of example and not limitation, alternative apparatus for measuring the attribute of a product and which may be included in article transfer device 28 will be discussed. In the case of measuring the attribute of product color or surface quality of the product, it may be desirable to use a reflectometer or colorimeter to measure properties of the surface of the product being transferred. In the measurement of such attributes, the product as it is held by vacuum nozzle 22 would be subjected to a beam of light which would reflect off the product as it is held in nozzle 22, and the reflected light would be measured in accordance with the attribute of the product which is being measured. In order to affect operation of such a device, the present scheme of using the cam follower 86 attached to arm 24 to activate a switch which is embedded in cam 84 could be utilized. Alternatively, it may be desirable to include a light beam and a receiver of that light beam to activate the measurement device. In this latter instance of the light beam, the movement of the product when it is attached to vacuum nozzle 22 would interrupt the light beam thus activating the measuring apparatus to initiate the measurement of the attribute of the product held by nozzle 22. In another embodiment in which it is desired to determine the resistance of the product or article being transferred to pressure, a pressure sensor could be included in transfer station 28. As described above, the pressure sensor could be activated by either a trip switch on cam 84 which is contacted by cam follower 86 or the use of the interrupted light beam method could be utilized to activate the pressure sensor. In this embodiment, the pressure sensor would be pressed against the article being transferred and held by vacuum nozzle 22 and the amount of resistance presented by the product to the sensor pressing against the surface of the product could be determined. In yet another embodiment of the present invention, a camera can be included on product transfer station 28 which can be operated either by the previously described cam pressure switch activation method or the interrupted light beam activation method. The camera would receive an image of the product as it is held in vacuum nozzle 22 or as it is released from vacuum nozzle 22 and the image would then be transmitted to a computer for comparison with a database of images to allow characterization of the individual product 20 against the database information. Once again, and as previously described herein, the information gathered by these detection devices is transmitted to a computer for analysis and for subsequent activation of one of arms 42 to segregate the particular product 20 into its proper categorization bin.

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Having now described the features, discoveries and principles of the invention, the manner in which the inventive attribute process line is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method of determining the weight of an object while moving the object comprising the steps of:
    moving a pickup arm onto a weighing means,
    determining a tare weight of said pickup arm with said weighing means,
    sending said determined tare weight to a computer,
    advancing said pickup arm to contact a plurality of objects,
    securing at least one of said plurality of objects onto said pickup arm,
    repositioning said pickup arm onto said weighing means,
    determining the weight of said pickup arm and said object with said weighing means,
    sending said determined weight of said pickup arm and said object to said computer,
    calculating the weight of said object, and
    selecting a storage location for said object based on said calculated weight of said object.

2. The method as claimed in claim 1 wherein said weighing means is a load cell.

3. The method as claimed in claim 1 wherein said step of moving a pickup arm onto a weighing means comprises a weighing sensor for determining tare weight located at a first position, and said step of repositioning said pickup arm onto said weighing means comprises a second weighing sensor for determining the weight of said pickup arm and said object said second weighing sensor being located at a second position.

4. The method as claimed in claim 1 wherein said pickup arm comprises a nozzle having a low pressure atmosphere for securing at least one of said plurality of objects onto said pickup arm.

5. The method as claimed in claim 1 further comprising the steps of:
    releasing said object from said pickup arm at a second location, and
    transporting said object from said second location to said selected storage location.

6. The method as claimed in claim 5 wherein said step of transporting said object from said second location comprises a means for moving said object to said selected storage location.

7. The method as claimed in claim 1 wherein said storage location comprises a container positioned under said pickup arm.

8. A method of determining the weight of a semi-rigid and non-rigid object while moving the object comprising the steps of:
    moving an automated pickup arm along a path defined by a cam,
    situating said pickup arm at a weighing means to determine the tare weight of said pickup arm,
    sending said determined tare weight to a computer,
    advancing said pickup arm to contact a plurality of object at a first location,
    securing at least one of said plurality of objects onto said pickup arm,
    repositioning said pickup arm onto said weighing means to determine the weight of said pickup arm and said object,
    sending said determined weight of said pickup arm and said object to said computer,
    releasing said object from said pickup arm at a second location,
    calculating with said computer the weight of said object,
    selecting a final position for said object based on said calculated weight of said object, and
    relocating said object to said selected final position.

9. The method as claimed in claim 8 wherein said weighing means is on said path defined by said cam.

10. The method as claimed in claim 8 wherein said weighing means is a load cell contained within said cam.

11. The method as claimed in claim 8 wherein said second location comprises a means for moving said object to said selected final position.

12. The method as claimed in claim 8 wherein said step of situating said pickup arm at a weighing means comprises a first load cell to determine tare weight said sensor being located at a first position along said path defined by said cam, and said step of repositioning said pickup arm onto said weighing means comprises a second load cell for determining the weight of said pickup arm and said object said second weighing sensor being located at a second position along said path defined by said cam.

13. The method as claimed in claim 8 wherein said pickup arm comprises a low pressure nozzle for securing at least one of said plurality of objects onto said pickup arm.

14. The method as claimed in claim 8 wherein said final position comprises a container positioned under said pickup arm to receive said object.

15. An apparatus for transferring objects from a first location to a second location comprising:
    a frame,
    first means mounted on the frame for holding a plurality of objects,
    second means for moving objects away from the first means,
    third means for picking up objects from the first means and depositing the objects on the second means, said third means including a movable member, and a support mounted on the frame, said support having a bottom surface and a chamber open to the bottom surface, said member being located in engagement with said bottom surface,
    means supporting the member on the frame for movement relative to the first and second means,
    drive means for moving the member,
    an object pickup device mounted on the member having a lower open end and a passage open to the chamber, said object pickup device being operable to pickup an object in the first means, transport the object to a location above the second means and release the object thereby allowing the object to be placed onto the second means, and means to apply a vacuum to the chamber whereby flowing air is drawn through the lower open end and passage of the pickup device, said flowing air and vacuum being operable to move an object into engagement with the pickup device the improvement comprising:

a load cell for determining the weight of at least one of said a plurality of objects, an attribute measurement means for determining an attribute of at least one of said a plurality of objects, activation means associated with said apparatus, said activation means operating in response to apparatus movement or object movement to initiate the operation of said attribute measurement means.

16. The apparatus as claimed in claim 15 wherein said attribute measurement means is a camera.

17. The apparatus as claimed in claim 15 wherein said attribute measurement means is a colorimeter.

18. The apparatus as claimed in claim 15 wherein said attribute measurement means is a reflectometer.

19. The apparatus as claimed in claim 15 wherein said attribute measurement means is a pressure sensor to determine the resistence of said object to contact pressure.

20. The apparatus as claimed in claim 15 wherein said attribute measurement means is a temperature sensor.

21. The apparatus as claimed in claim 15 wherein said attribute measurement means determines the weight of the object.

22. The apparatus as claimed in claim 21 wherein said weight is determined by a load cell.

23. The apparatus of claim 15 wherein said second means is a conveyor for sequentially receiving objects and carrying the objects to a location remote from the first means.

24. A method of measuring an attribute of an object while moving the object between first and second locations comprising the steps of:

advancing a pickup arm to contact, at a first location, objects;

securing at least one of said plurality of objects onto said pickup arm;

advancing said pickup arm toward a second location;

performing, during said advancing step, an object attribute measurement using a pressure sensor to determine the resistence of said object to contact pressure;

transmitting said object attribute measurement to a computer;

determining with said computer a storage position for said object wherein said storage position is associated with a range of object attribute measurements; and releasing said object from said pickup arm at said second location.

25. A method of determining the weight of an object while moving the object comprising the steps of:

moving a pickup arm along a path defined by a cam;

situating said pickup arm at a weighing means comprising a first load cell to determine the tare weight of said pickup arm wherein said first load cell is located at a first position along said path defined by said cam;

sending said determined tare weight to a computer;

advancing said pickup arm to contact a plurality of object at a first location;

securing at least one of said plurality of objects onto said pickup arm;

repositioning said pickup arm onto said weighing means comprising a second load cell to determine the weight of said pickup arm and said object, wherein said second load cell is located at a second position along said path defined by said cam;

sending said determined weight of said pickup arm and said object to said computer;

releasing said object from said pickup arm at a second location;

calculating with said computer the weight of said object;

selecting a final position for said object based on said calculated weight of said object; and relocating said object to said selected final position.

26. A method of determining the weight of an object while moving the object comprising the steps of:

moving a pickup arm having a low pressure nozzle along a path defined by a cam;

situating said pickup arm at a weighing means to determine the tare weight of said pickup arm;

sending said determined tare weight to a computer;

advancing said pickup arm to contact a plurality of object at a first location;

securing at least one of said plurality of objects onto said pickup arm using said low pressure nozzle;

repositioning said pickup arm onto said weighing means to determine the weight of said pickup arm and said object;

sending said determined weight of said pickup arm and said object to said computer;

releasing said object from said pickup arm at a second location;

calculating with said computer the weight of said object;

selecting a final position for said object based on said calculated weight of said object; and relocating said object to said selected final position.

27. An apparatus for transferring objects from a first location to a second location comprising:

a frame;

first means mounted on the frame for holding a plurality of objects;

second means for moving objects away from the first means;

third means for picking up objects from the first means and depositing the objects on the second means, said third means including a movable member, and a support mounted on the frame, said support having a bottom surface and a chamber open to the bottom surface, said member being located in engagement with said bottom surface;

means supporting the member on the frame for movement relative to the first and second means;

drive means for moving the member;

an object pickup device mounted on the member having a lower open end and a passage open to the chamber;

said object pickup device being operable to pickup an object in the first means, transport the object to a location above the second means and release the object thereby allowing the object to be placed onto the second means; and means to apply a vacuum to the chamber whereby flowing air is drawn through the lower open end and passage of the pickup device, said flowing air and vacuum being operable to move an object into engagement with the pickup device and retain the object on the pickup device the improvement comprising:

a camera for determining an attribute of at least one of said a plurality of objects; and activation means associated with said apparatus, said activation means operating in response to apparatus movement or object movement to initiate the operation of said camera.

28. An apparatus for transferring objects from a first location to a second location comprising:

a frame;

first means mounted on the frame for holding a plurality of objects;

second means for moving objects away from the first means;

third means for picking up objects from the first means and depositing the objects on the second means, said third means including a movable member, and a support mounted on the frame, said support having a bottom surface and a chamber open to the bottom surface, said member being located in engagement with said bottom surface;

means supporting the member on the frame for movement relative to the first and second means;

drive means for moving the member;

an object pickup device mounted on the member having a lower open end and a passage open to the chamber, said object pickup device being operable to pickup an object in the first means, transport the object to a location above the second means and release the object thereby allowing the object to be placed onto the second means; and means to apply a vacuum to the chamber whereby flowing air is drawn through the lower open end and passage of the pickup device, said flowing air and vacuum being operable to move an object into engagement with the pickup device and retain the object on the pickup device the improvement comprising:

a colorimeter for determining an attribute of at least one of said a plurality of objects; and activation means associated with said apparatus, said activation means operating in response to apparatus movement or object movement to initiate the operation of said colorimeter.

29. An apparatus for transferring objects from a first location to a second location comprising:

a frame;

first means mounted on the frame for holding a plurality of objects;

second means for moving objects away from the first means;

third means for picking up objects from the first means and depositing the objects on the second means, said third means including a movable member, and a support mounted on the frame, said support having a bottom surface and a chamber open to the bottom surface, said member being located in engagement with said bottom surface;

means supporting the member on the frame for movement relative to the first and second means;

drive means for moving the member;

an object pickup device mounted on the member having a lower open end and a passage open to the chamber;

said object pickup device being operable to pickup an object in the first means, transport the object to a location above the second means and release the object thereby allowing the object to be placed onto the second means; and means to apply a vacuum to the chamber whereby flowing air is drawn through the lower open end and passage of the pickup device, said flowing air and vacuum being operable to move an object into engagement with the pickup device and retain the object on the pickup device the improvement comprising:

a reflectometer for determining an attribute of at least one of said a plurality of objects; and activation means associated with said apparatus, said activation means operating in response to apparatus movement or object movement to initiate the operation of said reflectometer.

30. A method of measuring an attribute of a semi-rigid and non-rigid object while moving the object between first and second locations comprising the steps of:

advancing an automated pickup arm to contact, at a first location, objects, securing at least one of said plurality of objects onto said pickup arm, advancing said pickup arm toward a second location, performing, during said advancing step, an object attribute measurement to determine the weight of said object, transmitting said object attribute measurement to a computer, determining with said computer a storage position for said object wherein said storage position is associated with a range of object attribute measurements, and releasing said object from said pickup arm at said second location.

31. A method of measuring an attribute of a semi-rigid and non-rigid object while moving the object between first and second locations comprising the steps of:

advancing an automated pickup arm to contact, at a first location, objects, securing at least one of said plurality of objects onto said pickup arm, advancing said pickup arm toward a second location, performing, during said advancing step, an object attribute measurement to determine the weight of said object using a load cell, transmitting said object attribute measurement to a computer, determining with said computer a storage position for said object wherein said storage position is associated with a range of object attribute measurements, and releasing said object from said pickup arm at said second location.

\* \* \* \* \*

UNITED STATES PATENT AND TRADEMARK OFFICE
CERTIFICATE OF CORRECTION

PATENT NO.    : 6,881,907 B2
DATED         : April 19, 2005
INVENTOR(S)   : Antoine J.H. Winkelmolen It is certified that error appears in the above-identified patent and that said Letters Patent is hereby corrected as shown below:

Column 11,
Line 24, after "moving" delete "a" and insert -- an automated --.

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,881,907 B2
DATED : April 19, 2005
INVENTOR(S) : Antoine J. H. Winkelmolen It is certified that error appears in the above-identified patent and that said Letters Patent is hereby corrected as shown below:

Column 11,
Line 24, after "moving" delete "a" and insert -- an automated --.

Column 13,
Line 10, after "device" insert -- and retain the object on the pickup device --.

Signed and Sealed this

Third Day of January, 2006

JON W. DUDAS
*Director of the United States Patent and Trademark Office*